Patented Feb. 4, 1936

2,029,618

UNITED STATES PATENT OFFICE 2,029,618

PRODUCTION OF ALCOHOLS

Heinrich Hopff, Ludwigshafen-on-the-Rhine, Germany, assignor to I. G. Farbenindustrie Aktiengesellschaft, Frankfort-on-the-Main, Germany

REISSUED
OCT 14 1941

No Drawing. Application May 11, 1931, Serial No. 536,670. In Germany May 23, 1930

20 Claims. (Cl. 260—153)

The present invention relates to the production of alcohols.

I have found that aliphatic, cycloaliphatic, aliphatic aromatic or aromatic hydrocarbons, or non-substituted heterocyclic compounds, such as pyridine, thiophene or dioxane, and their homologues, boiling above 0° C. at atmospheric pressure, are converted into alcohols in a simple and advantageous manner by treating them in the presence of a Friedel-Crafts condensing agent with alkylene oxides, or substances capable of forming alkylene oxides, if desired at a pressure above atmospheric pressure. Mono-halogen derivatives of the said initial materials may also be converted into alcohols in the same manner; the term "non-substituted" means that the initial materials must be free from reactive amino, hydroxyl or carboxyl groups, compounds containing these groups being inoperative for the purposes of the present invention.

Suitable hydrocarbons are for example pentane, hexane, heptane, dodecene, octadecene and the like, cyclohexane, hexahydrotoluene, benzene, toluene, naphthalene and the like. Mixtures of hydrocarbons which occur naturally or which are formed industrially may also be employed, as for example those which are present in petroleum fractions, benzines, paraffins, middle oils, brown coal tar oils and products of the destructive hydrogenation of coals, tars and the like. Of the heterocyclic compounds, pyridine, quinoline, thiophene and the like may be employed for example. As other materials may be mentioned mono-halogen paraffin hydrocarbons, such as ethyl or butyl chlorides, mono-halogen benzene and mono-halogen toluenes and the like.

For the treatment of the said initial materials, alkylene oxides, such as ethylene oxide, 1.2- or 1.3-propylene oxides, normal butylene oxides, isobutylene oxide, trimethyl-ethylene oxide, glycide and the like may be employed and also substances which are capable of forming alkylene oxides during the reaction as for example glycol chlorhydrins and epichlorhydrin. The Friedel-Crafts condensing agents are for example anhydrous aluminum halides, such as aluminum chloride, bromide or iodide, boron fluoride, anhydrous iron chloride and like acid reacting halides of solid elements melting above 300° C. as are usually employed in Friedel-Crafts reactions.

Generally speaking the reaction takes place even at room temperatures by bringing the reaction components together or even at between 10° C. below and above zero. It is frequently advantageous, however, to work at higher temperatures, say up to about 100° C., in order to accelerate and complete the reaction. When readily volatile compounds are employed, such as ethylene oxide or butane, it is preferable to carry out the reaction in closed vessels, so that a pressure above atmospheric pressure may be generated. Organic diluents which are inert under the conditions of working may also be employed as for example carbon disulphide or carbon tetrachloride, especially on working with solid initial materials which may be liquefied by the addition of the said solvents. The working up of the reaction mixture, which is usually obtained in the form of a viscous mass, is carried out by decomposition with ice and water, separation of the alcohols from unchanged initial material and fractional distillation.

The temperatures of working must not considerably exceed 100° C. since otherwise the alcohols formed may react with remainders of the initial materials with the formation of hydrocarbons by splitting off water.

The following examples will further illustrate the nature of this invention, but the invention is not restricted to these examples. The parts are by weight.

*Example 1*

500 parts of benzene are stirred with 250 parts of anhydrous aluminum chloride and ethylene oxide is then led into the mixture while cooling to about 5° C. and stirring until there is no further absorption of ethylene oxide. The resulting brownish solution is poured on to ice and the benzene layer is separated. After distilling off unattacked benzene 85 parts of a brown oil remains behind which boils mainly between 200° and 220° C. and practically consists of pure phenyl-ethyl alcohol. The melting point of the phenyl urethane is 79° C.

If the ethylene oxide be led in not at ordinary temperature but at from about 50° to 60° C. in addition to phenylethyl alcohol a considerable amount of dibenzyl is formed from the phenylethyl alcohol first formed by further condensation with benzene with the splitting off of water.

Ethylene chlorhydrin may be employed instead of ethylene oxide with the same result.

*Example 2*

250 parts of anhydrous aluminum bromide are added to 500 parts of normal pentane and ethylene oxide is led into the mixture at room temperature while stirring vigorously until no further absorption of ethylene oxide takes place.

The reaction product is worked up as described in Example 1 and yields 25 parts of an oil which boils mainly between 160° and 190° C. and contains considerable amounts of normal heptyl alcohol.

Other hydrocarbons, as for example hexane, heptane, and the like or mixtures of hydrocarbons, such as benzines, varieties of kerosene and the like may be employed instead of normal pentane. Other alkylene oxides, such as propylene oxide, butylene oxide and the like react in the same manner.

*Example 3*

150 parts of anhydrous aluminum chloride are added to 500 parts of an American kerosene in an autoclave and the whole treated with ethylene oxide at room temperature and at about 0.5 atmosphere (superatmospheric pressure) until there is no further decrease in pressure. The reaction product consists of a brownish colored very viscous lower layer and a colorless upper layer. The latter contains only unchanged petroleum and is poured off. The lower layer is treated with ice and the resulting 32 parts of oily product are separated from water. It boils between 150° and 200° C. at 12 millimeters mercury gauge and consists of higher alcohols.

*Example 4*

132 parts of anhydrous aluminum chloride are added to 500 parts of ethyl chloride and 50 parts of ethylene oxide are led into the mixture while stirring rapidly and cooling continuously. After evaporating off the excess of ethyl chloride, ice is added to the dark colored residue and the whole is acidified with hydrochloric acid and subjected to extraction with ethyl ether. After separating the aqueous layer, the ether is distilled off and 45 parts of a brown oil remain behind which when fractionally distilled yield first runnings boiling between 130° and 140° C. containing mainly glycol chlorhydrin and a fraction boiling between 60° and 100° C. at 20 millimeters which contains 1.4-butylene chlorhydrin.

*Example 5*

100 parts of anhydrous aluminum chloride are introduced while cooling into 500 parts of anhydrous pyridine and 100 parts of ethylene oxide are introduced into the resulting solution for 4 hours at from 30° to 40° C. The reaction product is poured into water, extracted with ethyl ether and the ethereal extract is dried with dry potassium carbonate and subjected to fractional distillation. Together with about 350 parts of unaltered pyridine, 15 parts of basic oil, boiling from 100° to 150° C. at 20 millimeters of mercury and consisting of isometric hydroxy-ethyl pyridines, are obtained.

*Example 6*

500 parts of cyclohexane are mixed, while cooling, with 132 parts of anhydrous aluminum chloride and 50 parts of ethylene oxide are added, while cooling and stirring, the aluminum chloride being gradually converted into a viscous, pasty mass. Unaltered cyclohexane is drawn off and the tough residue is decomposed by adding a mixture of ice and water. After adding 100 parts of concentrated hydrochloric acid, the reaction product is distilled with steam. After extraction of the distillate with ethyl ether, the extract furnishes 70 parts of an oil, boiling mainly at from 95° to 105° C. at 13 millimeters of mercury and consisting mainly of hydroxyethyl cyclohexane.

*Example 7*

128 parts of naphthalene dissolved in 400 parts of carbon disulphide are incorporated with 132 parts of anhydrous aluminum chloride, whereupon about 50 parts of ethylene oxide are gradually added while stirring and cooling. On working up as described in the foregoing examples 60 parts of an oil are obtained which boils from 145° to 150° C. at 2 millimeters of mercury and which crystallizes to a pasty mass on cooling and consists of $C_{10}H_7$—$C_2H_4OH$. Similar products are obtained from methyl naphthalenes.

What I claim is:

1. The process for the production of non-tertiary alcohols, which comprises acting with an alkylene oxide in the presence of a Friedel-Crafts condensing agent on an organic compound selected from the group consisting of hydrocarbons, non-substituted heterocyclic compounds and mono-halogen derivatives of both, at a temperature up to 100° C.

2. The process for the production of monohydric, non-tertiary alcohols, which comprises acting with an alkylene oxide in the presence of an anhydrous aluminum halide on an organic compound selected from the group consisting of hydrocarbons, non-substituted heterocyclic compounds and mono-halogen derivatives of both, at a temperature up to 100° C.

3. The process for the production of monohydric, non-tertiary alcohols, which comprises acting with an alkylene oxide in the presence of a Friedel-Crafts condensing agent on a hydrocarbon in the liquefied state, at a temperature up to 100° C.

4. The process for the production of monohydric, non-tertiary alcohols, which comprises acting with a glycol halogen-hydrin in the presence of a Friedel-Crafts condensing agent on an organic compound selected from the group consisting of hydrocarbons, non-substituted heterocyclic compounds and mono-halogen derivatives of both, thereby forming an alkylene oxide in the reaction mixture.

5. The process for the production of monohydric, non-tertiary alcohols, which comprises acting with an alkylene oxide, while warming, in the presence of an anhydrous aluminum halide on an organic compound selected from the group consisting of hydrocarbons, non-substituted heterocyclic compounds and mono-halogen derivatives of both, at a temperature up to 100° C.

6. The process for the production of monohydric, non-tertiary alcohols, which comprises acting with an alkylene oxide in the presence of an anhydrous aluminum halide on a hydrocarbon in the liquefied state, at a temperature up to 100° C.

7. The process for the production of monohydric, non-tertiary alcohols which comprises acting with an alkylene oxide in the presence of anhydrous aluminum chloride on a hydrocarbon in the liquefied state, at a temperature up to 100° C.

8. The process for the production of monohydric, non-tertiary alcohols, which comprises acting with an alkylene oxide in the presence of anhydrous aluminum chloride on an aromatic hydrocarbon in the liquefied state, at a temperature up to 100° C.

9. The process for the production of monohydric, non-tertiary alcohols, which comprises acting with an alkylene oxide in the presence of anhydrous aluminum chloride on a liquid aromatic hydrocarbon at superatmospheric pressure and at a temperature up to 100° C.

10. The process for the production of phenylethyl alcohol, which comprises acting with ethylene oxide in the presence of an anhydrous aluminum halide on benzene at about 5° C.

11. The process for the production of phenylethyl alcohol, which comprises acting with ethylene oxide in the presence of anhydrous aluminum chloride on benzene at about 5° C.

12. A process for the manufacture of aromatic alcohols which comprises reacting ethylene oxide with an aromatic hydrocarbon in the presence of an acid condensing agent and maintaining the temperature of the reaction mass at about 6° C. during substantially the entire reaction period.

13. A process for the manufacture of phenyl propyl alcohol which comprises reacting propylene oxide with benzene in the presence of an acid condensing agent, and maintaining the temperature of the reaction mass below 40° C. during substantially the entire reaction period.

14. A process for the manufacture of phenyl propyl alcohol which comprises reacting propylene oxide with benzene in the presence of anhydrous aluminum chloride, and maintaining the temperature of the reaction mass below 40° C. during substantially the entire reaction period.

15. A process for the manufacture of tolyl propyl alcohol which comprises reacting propylene oxide with toluene in the presence of an acid condensing agent, and maintaining the temperature of the reaction mass below 40° C. during substantially the entire reaction period.

16. A process for the manufacture of tolyl propyl alcohol which comprises reacting propylene oxide with toluene in the presence of anhydrous aluminum chloride, and maintaining the temperature of the reaction mass below 40° C., during substantially the entire reaction period.

17. A process for the manufacture of aromatic alcohols, which comprises reacting an alkylene oxide with an aromatic hydrocarbon in the presence of an acid condensing agent and artificially cooling the reaction mass during substantially the entire reaction period.

18. A process for the manufacture of aromatic alcohols, which comprises reacting an alkylene oxide with an aromatic hydrocarbon in the presence of an acid condensing agent and keeping the temperature of the reaction mass below 40° C. during substantially the entire reaction period.

19. A process for the manufacture of aromatic alcohols, which comprises reacting an alkylene oxide with an aromatic hydrocarbon in the presence of an acid condensing agent at or below room temperature during substantially the entire reaction period.

20. A process for the manufacture of aromatic alcohols, which comprises reacting an alkylene oxide with an aromatic hydrocarbon in the presence of an acid condensing agent and an inert organic diluent, and keeping the temperature of the reaction mass below 40° C. during substantially the entire reaction period.

HEINRICH HOPFF.